G. W. Livermore,
Jointing Staves.
N° 14,299. Patented Feb. 19, 1856.
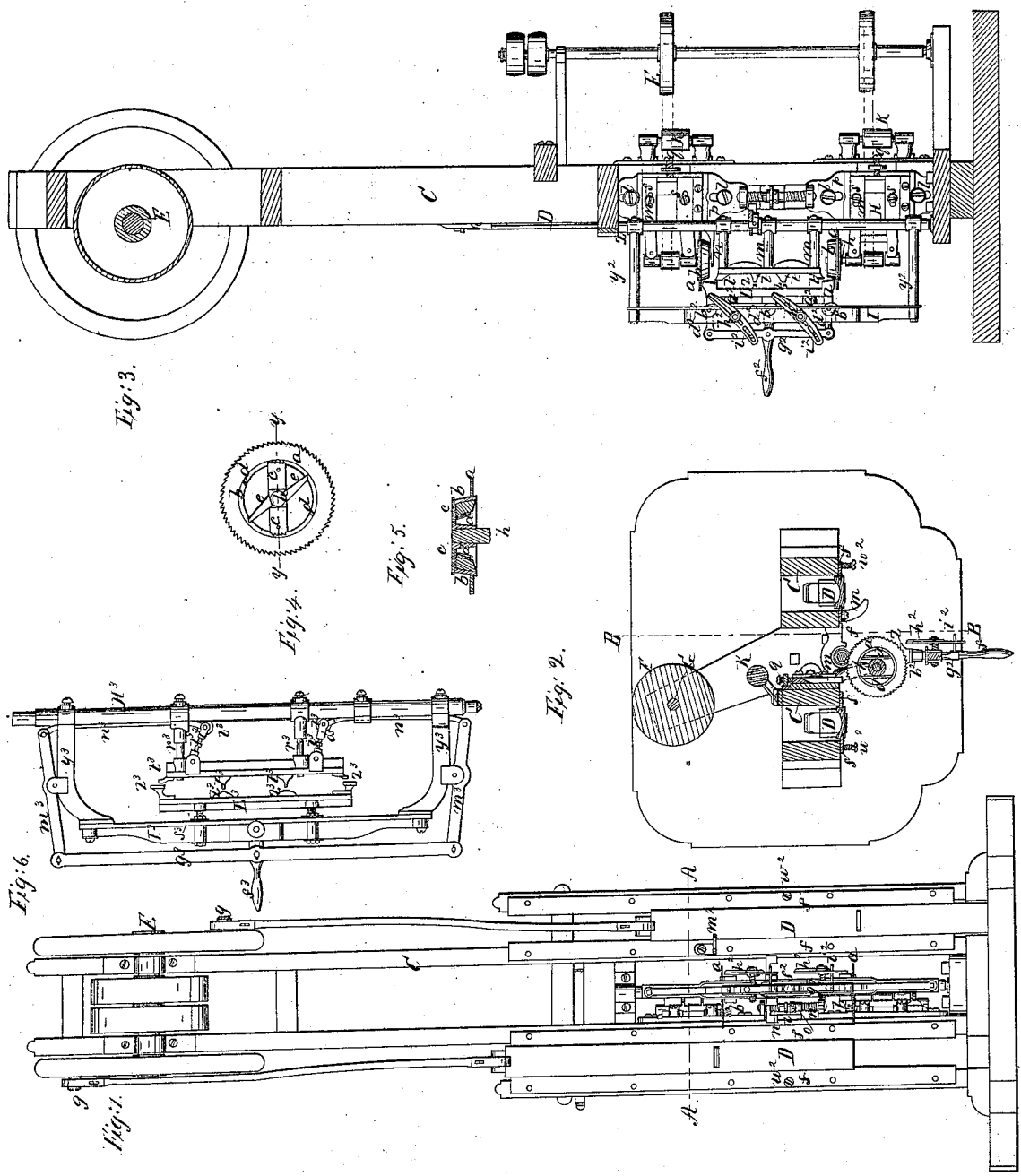

UNITED STATES PATENT OFFICE.

GEO. W. LIVERMORE, OF CAMBRIDGEPORT, MASSACHUSETTS, ASSIGNOR TO LIVERMORE MANUFG. CO.

STAVE-MACHINE.

Specification of Letters Patent No. 14,299, dated February 19, 1856.

*To all whom it may concern:*

Be it known that I, GEO. W. LIVERMORE, of Cambridgeport, in the county of Middlesex and State of Massachusetts, have invented certain new and useful Improvements in Machines for Chamfering, Crozing, and Jointing Staves, of which the following is a full, clear, and exact description, reference being had to the accompanying drawings, making part of this specification, in which—

Figure 1, is a front elevation; Fig. 2, horizontal section upon the line A, A, of Fig. 1; Fig. 3, a vertical section upon the line B, B, of Fig. 2; Figs. 4, 5 and 6, details which will be referred to hereafter.

My invention has for its object to joint the stave upon each edge, to cut it to the required length, and to croze and chamfer it without removing it from the clamps in which it is confined, and my invention consists in a peculiarly constructed machine for the purpose of effecting the above operations, which I will now proceed to describe.

In the machine represented in the accompanying drawings the operating parts are carried by the frame work C, attached to which are the jointers D, by which the edges of the staves are dressed. These jointers run in ways $f$, and are operated by suitable cranks $g$, upon the driving shaft E.

I will now describe the construction and operation of the cutters and saw by which the stave is cut to a length, crozed, and chamfered.

In Fig. 4, the saw and cutters are represented in plan, and in Fig. 5 in section upon the line $y$, $y$, of Fig. 4. The annular saw $a$, by which the stave is cut to the desired length, is attached to the head $b$, which is suitably tapered to chamfer the end of the stave. To this same head are attached the crozing cutters $c$, and the chamfering cutters $d$. The cutters $e$, are for the purpose of trimming the edge of the croze. The head with the cutters thus attached is secured to the shaft $h$, a rapid revolving motion being communicated to the shaft by means of a band from the pulley F, upon the shaft G. This band passes over the guide pulley $k$, and is indicated by red lines in Fig. 3. There are two heads, each carrying a similar set of cutters, one for each end of the stave. These heads are hung in frames or carriages $m$, which slide horizontally in suitable ways or grooves in secondary carriages $p$, which may be adjusted in a vertical plane by the right and left screws $n$, attached to a head $o$, which revolves in a suitable collar or guide $i$, projecting from the frame work of the machine, by turning this double screw the carriages with their saws and cutters are each moved an equal distance to or from the center of the machine for the purpose of elongating the stave; when suitably adjusted these carriages are secured to the frame by the slot and screws $l$, or by other suitable contrivances. The carriages $m$, are adjusted within the secondary carriages $p$, by the screws $q$, and are held in position by slots and screws $s$.

I will now describe the clamp in which the stave is held while being dressed. The stationary jaws $t$, of this clamp are carried by arms $w$, projecting from the vertical shaft H, the axis of which corresponds to the axis of the barrel or other cask to be made, and which is pivoted to the framework at $x$, $x$.

$y^2$, $y^2$, are arms also secured to the shaft H, which carry the bar I. The movable jaws $z$, attached to the clamp bar L, are allowed a slight motion to and from the bar I, the pins $a^2$, projecting from the clamp bar entering suitable holes in the bar I. The jaws $z$, are drawn back from the stationary jaws for the purpose of opening the clamp, by the springs $c^2$, and the clamp is closed by means of the eccentrics or cams $b^2$, attached to the arms $d^2$, which pass through slots in the bar I, and are pivoted thereto. The center one of the arms $d^2$, is prolonged to form the handle $f^2$, and the three are united together by the connecting straps $g^2$, as will be seen from an inspection of Fig. 3. When the handle $f^2$ is raised to its highest position, the clamp will be opened, and when this handle is depressed the clamp is closed.

$h^2$, are stops or guides pivoted to the bar I, which serve to determine the position of the stave in the clamps, the pins $i^2$ upon the connecting bar $g^2$, enters slots in these stops and moves them up as required. When the clamp is open to receive the stave, the guides are thrown into a horizontal position, and the stave is thrust in until it rests against them. When the clamp is closed these guides are thrown up as seen in Fig. 3, out of the reach of the jointers.

The machine represented in the accompanying drawings is calculated to make casks of a certain size, the saws being capable of only slight adjustment either to or from each other, or to or from the axis of the shaft H. If the same machine be intended for making casks of different sizes, the extent of motion allowed to the saws may be increased, and in such case the inner instead of the outer jaw of the clamp should be made movable, the other remaining stationary, becomes necessary whenever the thickness of the stuff employed, is at all variable in order that the chamfer and croze may be uniform with respect to the exterior surface of the stave and also where the same machine is to be used for casks of different size. A clamp so constructed is represented in Fig. 6 of the accompanying drawings, in which $H^3$ is the shaft upon which it turns, $Z^3$, the stationary jaws which are attached by means of set screws to the stationary bar, $I^3$, this bar is supported by the arms $y^3$ projecting from the shaft $H^3$. The handle $f^3$, gives motion, as in the clamp already described, to the bar $g^3$, to which are attached the levers $m^3$, pivoted to the arms $y^3$—the other ends of the levers $m^3$, are connected with the rods $n^3$, which are confined to the shaft by clasps or otherwise but are permitted to slide longitudinally as the lever $f^3$, is moved. The ends of these rods carry friction rolls $l^3$, and are connected by links $o^3$ with the movable jaws $t^3$, of the clamp, these jaws are guided in their motion to and from the stationary jaws $z^3$, by the pins $r^3$. When the lever $f^3$, is raised the clamp is opened, when it is depressed the clamp is closed. The position of the stationary clamp may be varied by the nuts and screws $s^3$, the length of the links $o^3$, being varied to accord therewith by the right and left screws $i^3$.

Operation: Power being applied to the shafts E, and G, the jointers D, are vibrated up and down, and the saws and cutters are caused to revolve by the connections already explained. The staves to be operated upon are previously shaped in the grooved or toothed rollers for which letters patent were granted to me on the 21st day of March, 1854. The operator laying hold of the handle $f^2$ opens the clamp and inserts a stave, its upper end resting against the stationary stop $m^2$, attached to the frame work; the position of the stave in the clamps being otherwise regulated by the stops $h^2$, as before explained. The handle $f^2$, is then depressed and the stave is held firmly in the clamp. The operator still holding by this handle revolves the clamp around the axis of the shaft H, the stave being brought to the desired length and its two ends dressed as it passes the revolving saws and cutters. The stave is now borne up against one of the jointers by which one of its edges is jointed, the adjustable stop $w^2$ serving to arrest the motion of the clamp and bring all the staves to an equal width. The stave is then swung around to the opposite side of the machine and its other edge is jointed, the clamp is then opened, the finished stave falls out, another is inserted, and the operation continues as before. The stave is thus brought to the desired length, jointed, crozed, and chamfered, at a single operation. The jointers D, move in a vertical plane passing through the axis of the shaft H, and as the staves are brought to the exact curve both longitudinally and transversely which they are to occupy in the cask, it is evident that each stave will be jointed in a plane passing through the axis of the cask as is required in order to form a tight joint.

What I claim as my invention and desire to secure by Letters Patent, is—

The within described machine for jointing, crozing, and chamfering staves, consisting essentially of the clamp for holding the stave, the jointers D, and the crozing chamfering cutters, combined and operating in the manner substantially as herein set forth.

GEO. W. LIVERMORE.

Witnesses:
 THOS. R. ROACH,
 SAM. COOPER.